US012646488B2

(12) United States Patent
Chien

(10) Patent No.: US 12,646,488 B2
(45) Date of Patent: Jun. 2, 2026

(54) DISPLAY DEVICE, DISPLAY DRIVER IC AND OPERATING METHOD OF DISPLAY DRIVER IC

(71) Applicant: Novatek Microelectronics Corp., Hsinchu (TW)

(72) Inventor: Tso-Hua Chien, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/001,397

(22) Filed: Dec. 24, 2024

(65) Prior Publication Data

US 2025/0266015 A1 Aug. 21, 2025

(30) Foreign Application Priority Data

Feb. 19, 2024 (TW) ................................ 113105694

(51) Int. Cl.
*G09G 5/12* (2006.01)
*G09G 5/00* (2006.01)

(52) U.S. Cl.
CPC ............... *G09G 5/12* (2013.01); *G09G 5/003* (2013.01); *G09G 2310/08* (2013.01); *G09G 2370/08* (2013.01)

(58) Field of Classification Search
CPC .................................................... G09G 3/3648
See application file for complete search history.

(56) References Cited

U.S. PATENT DOCUMENTS 6,177,922 B1 1/2001 Schiefer et al.
6,864,884 B2 3/2005 Nakano et al.
8,878,995 B2 11/2014 Cha et al.
9,318,072 B2 4/2016 Cha et al.
2003/0067552 A1 4/2003 Leyvi et al.
2005/0083290 A1* 4/2005 Katagawa ................ G09G 3/20 345/100
2006/0001631 A1* 1/2006 Yamazaki ................ G09G 3/20 345/98

(Continued)

FOREIGN PATENT DOCUMENTS

CN 102982759 3/2013
CN 116072045 5/2023
TW 518551 1/2003

*Primary Examiner* — Nan-Ying Yang
(74) *Attorney, Agent, or Firm* — JCIPRNET

(57) ABSTRACT

A display driver integrated circuit (DDIC) receives a data stream, where the data stream includes display frame data, vertical synchronization information, and horizontal synchronization information. The DDIC generates an internal horizontal synchronization signal based on the horizontal synchronization information. The DDIC starts counting a first counting time length and a second counting time length from a same horizontal synchronization pulse of the internal horizontal synchronization signal, where the first counting time length is less than a horizontal time length defined by the internal horizontal synchronization signal, and the second counting time length is greater than the horizontal time length. At the end of the first counting time length, the DDIC pulls a gate clock signal from a first level to a second level. At the end of the second counting time length, the DDIC pulls the gate clock signal back from the second level to the first level.

19 Claims, 4 Drawing Sheets

(56) References Cited

U.S. PATENT DOCUMENTS

| | | | | |
|---|---|---|---|---|
| 2008/0055220 | A1* | 3/2008 | Azuma | G09G 3/2096<br>345/89 |
| 2014/0028639 | A1* | 1/2014 | Kim | G09G 5/001<br>345/204 |
| 2014/0125639 | A1 | 5/2014 | Cho | |
| 2023/0133606 | A1 | 5/2023 | Kim et al. | |

* cited by examiner

DISPLAY DEVICE, DISPLAY DRIVER IC AND OPERATING METHOD OF DISPLAY DRIVER IC

CROSS-REFERENCE TO RELATED APPLICATION

This application claims the priority benefit of Taiwan application serial no. 113105694, filed on Feb. 19, 2024. The entirety of the above-mentioned patent application is hereby incorporated by reference herein and made a part of this specification.

BACKGROUND

Technical Field

The invention relates to an electronic device, and particularly relates to a display device, a display driver IC and an operating method of the display driver IC.

Description of Related Art

An application processor (AP) may load display frame data, vertical synchronization information and horizontal synchronization information to a data stream, and then provide the data stream to a display driver integrated circuit (DDIC) through a data lane of a mobile industry processor interface (MIPI). The vertical synchronization information may be a vertical sync start (VSS) tag defined by the MIPI specification, and the horizontal synchronization information may be a horizontal sync start (HSS) tag defined by the MIPI specification. The DDIC may drive a display panel based on the display frame data, the vertical synchronization information and the horizontal synchronization information provided by the AP. For example, the DDIC may generate a gate clock signal to a scan circuit of the display panel, so that the scan circuit drives a plurality of scan lines (which are also referred to as gate lines) of the display panel.

A phase of the gate clock signal should be synchronized with a phase of the HSS tag. Generally, due to various reasons (for example, the HSS is delayed due to transmission of an MIPI command), a transition phase (a phase of a rising edge and/or a falling edge) of the gate clock signal may constantly change. The changes in the transition phase of the gate clock signal may cause an ON time (or ON time length) of the gate clock signal to be unstable. The unstable ON time length of the gate clock signal results in fluctuation of a charging time of pixels, causing abnormal display of the display panel. How to ensure the ON time length of the gate clock signal to be fixed is one of many technical issues in this field.

SUMMARY

The invention is directed to a display device, a display driver IC and an operating method of the display driver IC to drive a display panel.

An embodiment of the invention provides a display driver IC including an interface circuit and a synchronization signal generating circuit. The interface circuit receives a data stream from a processor, wherein the data stream includes display frame data, vertical synchronization information, and horizontal synchronization information. The synchronization signal generating circuit generates an internal horizontal synchronization signal based on the horizontal synchronization information. The synchronization signal generating circuit starts counting a first counting time length and a second counting time length from a first horizontal synchronization pulse. The synchronization signal generating circuit pulls a first gate clock signal from a first level to a second level at the end of the first counting time length. The synchronization signal generating circuit pulls the first gate clock signal back from the second level to the first level at the end of the second counting time length. The first counting time length is less than a first horizontal time length, the second counting time length is greater than the first horizontal time length, and the first horizontal time length is a time length between the first horizontal synchronization pulse and a second horizontal synchronization pulse.

An embodiment of the invention provides an operating method including: receiving a data stream from a processor by an interface circuit of a display driver IC, wherein the data stream includes display frame data, vertical synchronization information, and horizontal synchronization information; generating an internal horizontal synchronization signal by a synchronization signal generating circuit of the display driver IC based on the horizontal synchronization information; counting a first counting time length and a second counting time length from a first horizontal synchronization pulse in the internal horizontal synchronization signal by the synchronization signal generating circuit; pulling a first gate clock signal from a first level to a second level by the synchronization signal generating circuit at the end of the first counting time length; and pulling the first gate clock signal back from the second level to the first level by the synchronization signal generating circuit at the end of the second counting time length. Wherein, the first counting time length is less than a first horizontal time length, the second counting time length is greater than the first horizontal time length, and the first horizontal time length is a time length between the first horizontal synchronization pulse and a second horizontal synchronization pulse in the internal horizontal synchronization signal.

An embodiment of the invention provides a display device including a processor, a display panel and a display driver IC. The display driver IC is coupled to the processor to receive a data stream, wherein the data stream includes display frame data, vertical synchronization information, and horizontal synchronization information. The display driver IC generates an internal horizontal synchronization signal based on the horizontal synchronization information. The display driver IC starts counting a first counting time length and a second counting time length from a first horizontal synchronization pulse in the internal horizontal synchronization signal. The display driver IC pulls a first gate clock signal from a first level to a second level at the end of the first counting time length. The display driver IC pulls the first gate clock signal back from the second level to the first level at the end of the second counting time length. Wherein, the first counting time length is less than a first horizontal time length, the second counting time length is greater than the first horizontal time length, and the first horizontal time length is a time length between the first horizontal synchronization pulse and a second horizontal synchronization pulse in the internal horizontal synchronization signal.

Based on the above descriptions, the display driver IC according to the embodiments of the invention generates the internal horizontal synchronization signal based on the horizontal synchronization information provided by the processor, and then generates the gate clock signal to the scan circuit of the display panel based on the internal horizontal synchronization signal. Specifically, the display driver IC counts the first counting time length and the second counting time length (i.e., the phases of the rising edge and the falling edge of the gate clock signal) based on the phase of the same horizontal synchronization pulse in the internal horizontal synchronization signal. Since the phase of the falling edge and the phase of the rising edge have the same time reference point (using the same horizontal synchronization pulse in the internal horizontal synchronization signal), the ON time (or ON time length) of the gate clock signal may be guaranteed to be fixed.

To make the aforementioned more comprehensible, several embodiments accompanied with drawings are described in detail as follows.

DESCRIPTION OF THE EMBODIMENTS

Figure 1:
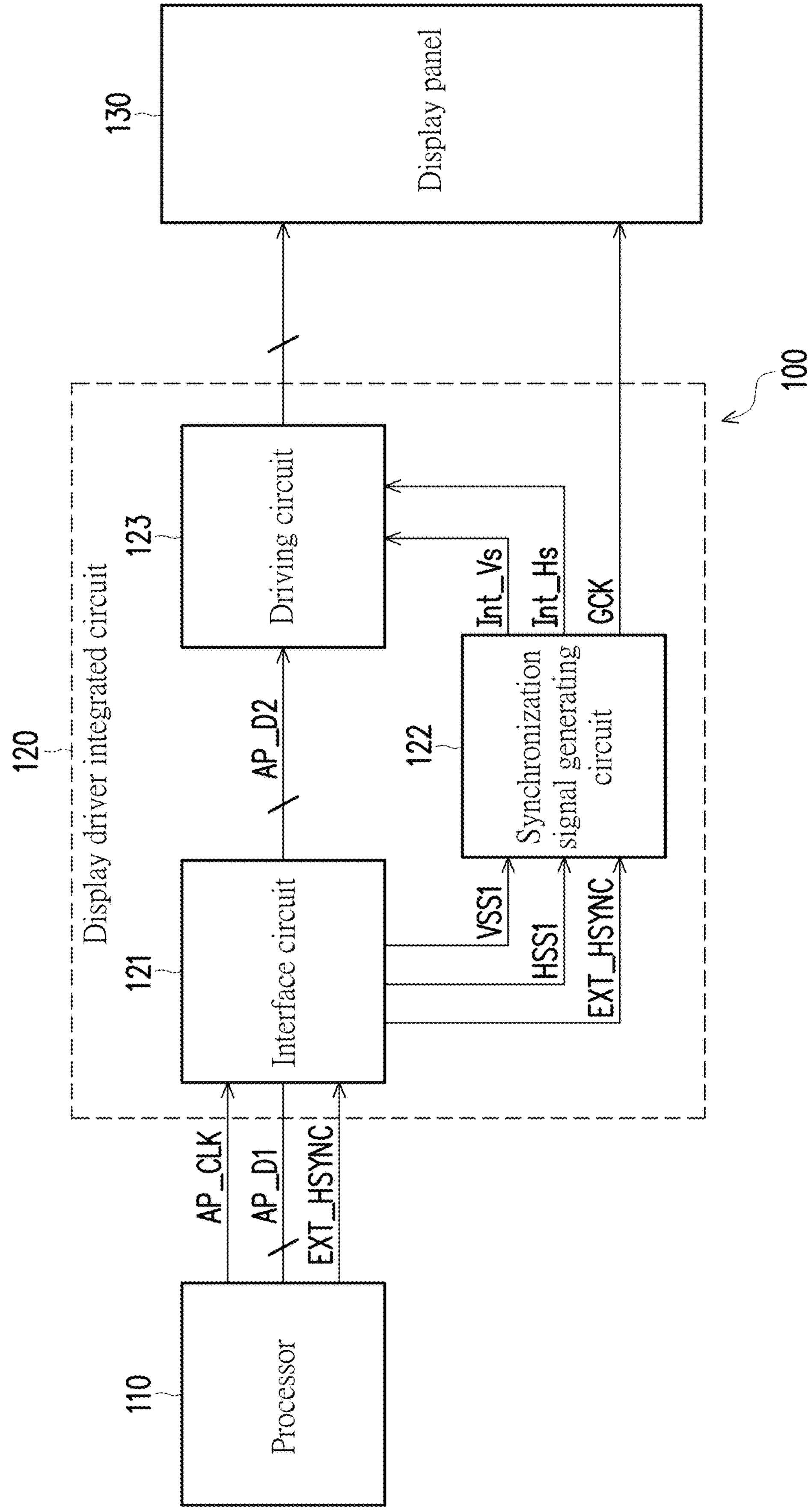
FIG. 1 is a circuit block schematic diagram of a display device according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. The terms "first" and "second" mentioned in the full text of the specification of the invention (including the scope of the patent application) are used to name elements or to distinguish different embodiments or scopes, and are not used to limit an upper or lower limit of the number of the elements, nor are they used to limit an order of the elements. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a display device 100 according to an embodiment of the invention. A display device 100 shown in FIG. 1 includes a processor 110, a display driver integrated circuit (DDIC) 120, and a display panel 130. The DDIC 120 is coupled to the processor 110 to receive a data stream AP_D1 and an external horizontal synchronization signal EXT_HSYNC. The specific transmission method of the data stream AP_D1 is not limited here. For example (but not limited thereto), the DDIC 120 may receive a clock signal AP_CLK and the data stream AP_D1 from the processor 110 through a mobile industry processor interface (MIPI) or other interfaces. The DDIC 120 may sample/latch data in the data stream AP_D1 based on the clock signal AP_CLK.

The DDIC 120 may unpack the data stream AP_D1 and decode the command in the packet. The data stream AP_D1 includes display frame data AP_D2, vertical synchronization information VSS1 and horizontal synchronization information HSS1. The vertical synchronization information VSS1 may include a vertical sync start (VSS) mark defined by the MIPI specification, and the horizontal synchronization information HSS1 may include a horizontal sync start (HSS) mark defined by the MIPI specification. The DDIC 120 may generate an internal vertical synchronization signal Int_Vs based on the vertical synchronization information VSS1 and the horizontal synchronization information HSS1. A phase of the internal vertical synchronization signal Int_Vs is synchronized with a phase of the vertical synchronization information VSS1. Based on a phase relationship between the vertical synchronization information VSS1, the horizontal synchronization information HSS1 and the external horizontal synchronization signal EXT_HSYNC, the DDIC 120 may generate an internal horizontal synchronization signal Int_Hs. A phase of the internal horizontal synchronization signal Int_Hs is synchronized with a phase of the horizontal synchronization information HSS1 or a phase of the external horizontal synchronization signal EXT_HSYNC.

The display panel 130 is coupled to the DDIC 120. The DDIC 120 may drive the display panel 130 based on the display frame data AP_D2, the internal vertical synchronization signal Int_Vs, and the internal horizontal synchronization signal Int_Hs. For example, the DDIC 120 may generate a gate clock signal GCK to a scan circuit (not shown) of the display panel 130, so that the scan circuit drives a plurality of scan lines (also known as gate lines, not shown) of the display panel. The embodiment does not limit the implementation of the scan circuit. For example, the scan circuit may include a GOA (a gate driving circuit on a display substrate) or other scan circuits.

In the embodiment shown in FIG. 1, the DDIC 120 includes an interface circuit 121, a synchronization signal generating circuit 122 and a driving circuit 123. According to different designs, in some embodiments, the processor 110, the DDIC 120, the interface circuit 121, the synchronization signal generating circuit 122 and/or the driving circuit 123 may be implemented in a hardware form. In other embodiments, the processor 110, the DDIC 120, the interface circuit 121, the synchronization signal generating circuit 122 and/or the driving circuit 123 may be implemented in a firmware form or a software (i.e., program) form or a combination thereof. In some embodiments, the processor 110, the DDIC 120, the interface circuit 121, the synchronization signal generating circuit 122 and/or the driving circuit 123 may be implemented in a combination of the hardware, firmware, and software forms.

In terms of hardware form, related functions of the processor 110, the DDIC 120, the interface circuit 121, the synchronization signal generating circuit 122 and/or the driving circuit 123 may be implemented in one or more controllers, microcontrollers, microprocessors, application-specific integrated circuits (ASIC), digital signal processors (DSP), field programmable gate arrays (FPGA), central processing units (CPU) and/or various logic blocks, modules and circuits in other processing units. The related functions of the processor 110, the DDIC 120, the interface circuit 121, the synchronization signal generating circuit 122 and/or the driving circuit 123 may be implemented as hardware circuits such as various logic blocks, modules and circuits in IC by using hardware description languages (such as Verilog HDL or VHDL) or other appropriate programming languages.

In terms of software form and/or firmware form, the related functions of the processor 110, the DDIC 120, the interface circuit 121, the synchronization signal generating circuit 122 and/or the driving circuit 123 may be implemented as programming codes. For example, general programming languages (such as C, C++ or assembly language) or other suitable programming languages are used to implement the processor 110, the DDIC 120, the interface circuit 121, the synchronization signal generating circuit 122 and/or the driving circuit 123. The programming codes may be recorded/stored in a "non-transitory machine-readable storage medium". In some embodiments, the non-transitory machine-readable storage medium includes, for example, a semiconductor memory and/or a storage device. An electronic device (such as a CPU, a controller, a microcontroller or a microprocessor) may read and execute the programming codes from the non-transitory machine-readable storage medium, thereby implementing the related functions of the processor 110, the DDIC 120, the interface circuit 121, the synchronization signal generating circuit 122 and/or the driving circuit 123.

Figure 2:
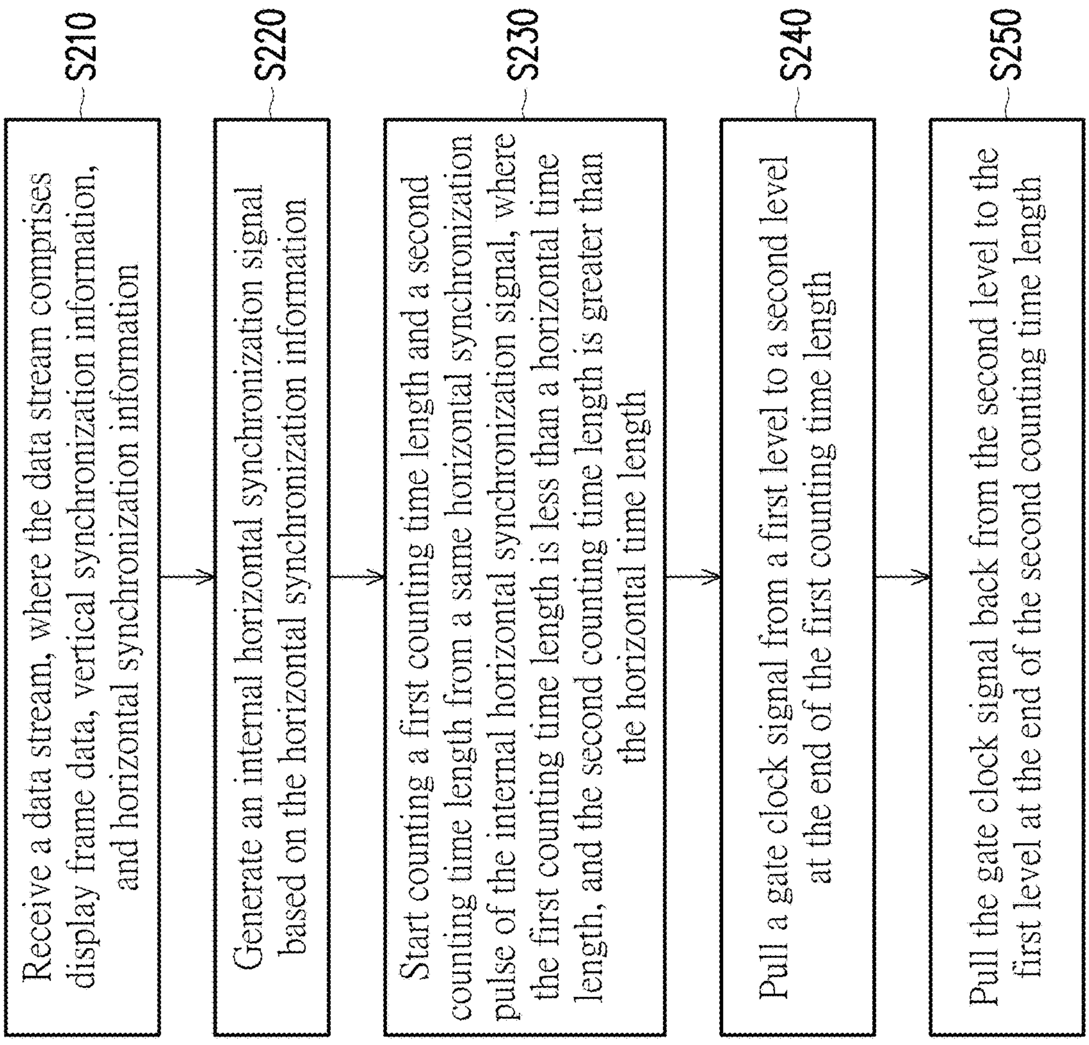
FIG. 2 is a schematic flowchart of an operating method of a display driver integrated circuit (DDIC) according to an embodiment of the invention.

FIG. 2 is a schematic flowchart of an operating method of the DDIC 120 according to an embodiment of the invention. Referring to FIG. 1 and FIG. 2, in step S210, the interface circuit 121 may receive the data stream AP_D1 from the processor 110. Based on an actual design, the interface circuit 121 may receive the clock signal AP_CLK and the data stream AP_D1 from the processor 110 through MIPI or other interfaces. The interface circuit 121 may sample/latch data in the data stream AP_D1 based on the clock signal AP_CLK. The interface circuit 121 may unpack the data stream AP_D1 and decode the command in the packet. Therefore, the interface circuit 121 may output the display frame data AP_D2, the vertical synchronization information VSS1 and the horizontal synchronization information HSS1 included in the data stream AP_D1.

The synchronization signal generating circuit 122 is coupled to the interface circuit 121 to receive the vertical synchronization information VSS1, the horizontal synchronization information HSS1 and the external horizontal synchronization signal EXT_HSYNC. The synchronization signal generating circuit 122 generates the internal vertical synchronization signal Int_Vs based on the vertical synchronization information VSS1 and/or the horizontal synchronization information HSS1. In step S220, the synchronization signal generating circuit 122 may generate the internal horizontal synchronization signal Int_Hs based on the horizontal synchronization information HSS1. For example (but not limited thereto), the synchronization signal generating circuit 122 may generate the internal horizontal synchronization signal Int_Hs by using the external horizontal synchronization signal EXT_HSYNC or the horizontal synchronization information HSS1. For another example, based on the phase relationship of the vertical synchronization information VSS1, the horizontal synchronization information HSS1 and the external horizontal synchronization signal EXT_HSYNC, the synchronization signal generating circuit 122 may generate the internal horizontal synchronization signal Int_Hs.

The driving circuit 123 is coupled to the interface circuit 121 to receive the display frame data AP_D2. The driving circuit 123 is further coupled to the synchronization signal generating circuit 122 to receive the internal vertical synchronization signal Int_Vs and the internal horizontal synchronization signal Int_Hs. The driving circuit 123 may count the internal horizontal synchronization signal Int_Hs to learn a timing of a next display frame. Based on the display frame data AP_D2, the internal vertical synchronization signal Int_Vs and the internal horizontal synchronization signal Int_Hs, the driving circuit 123 may drive a plurality of data lines (which are also referred to as source lines, not shown) of the display panel 130. The embodiment does not limit the implementation of the display panel 130 and driving details of the display panel 130. For example, the display panel 130 may be a well-known display panel or other display panels, and the driving circuit 123 may adopt a well-known driving method or other driving methods to drive the display panel 130.

Two horizontal synchronization pulses adjacent in timing in the internal horizontal synchronization signal Int_Hs define a horizontal time length. For example, the internal horizontal synchronization signal Int_Hs has a first horizontal synchronization pulse and a second horizontal synchronization pulse that are adjacent in timing, where the first horizontal synchronization pulse is earlier than the second horizontal synchronization pulse, and a time interval between the first horizontal synchronization pulse and the second horizontal synchronization pulse is a first horizontal time length. In step S230, the synchronization signal generating circuit 122 starts counting a first counting time length and a second counting time length from the first horizontal synchronization pulse (a same horizontal synchronization pulse of the internal horizontal synchronization signal Int_Hs), where the first counting time length is less than the first horizontal time length, and the second counting time length is greater than the first horizontal time length. In other words, the second horizontal synchronization pulse of the internal horizontal synchronization signal Int_Hs occurs between an end time point of the first counting time length and an end time point of the second counting time length.

At the end of the first counting time length, the synchronization signal generating circuit 122 pulls the gate clock signal GCK from the first level to the second level (step S240). At the end of the second counting time length, the synchronization signal generating circuit 122 pulls the gate clock signal GCK back from the second level to the first level (step S250). The first level and the second level may be determined according to an actual design. For example, in the case where "a low logic level represents an ON time of the gate clock signal", the first level may be a high logic level, and the second level may be the low logic level. On the contrary, in the case where "the high logic level represents the ON time of the gate clock signal", the first level may be the low logic level, and the second level may be the high logic level. The second horizontal synchronization pulse of the internal horizontal synchronization signal Int_Hs (a next pulse after the horizontal synchronization pulse serving as a reference time point) occurs during a period when the gate clock signal GCK is the "second level". The phase of the second horizontal synchronization pulse does not affect a transition phase (a phase of a rising edge or a falling edge) of the gate clock signal GCK pulled back from the second level to the first level. The synchronization signal generating circuit 122 may output the gate clock signal GCK to the scan circuit (not shown) of the display panel 130, so that the scan circuit drives a plurality of scan lines (not shown) of the display panel 130.

Figure 3:
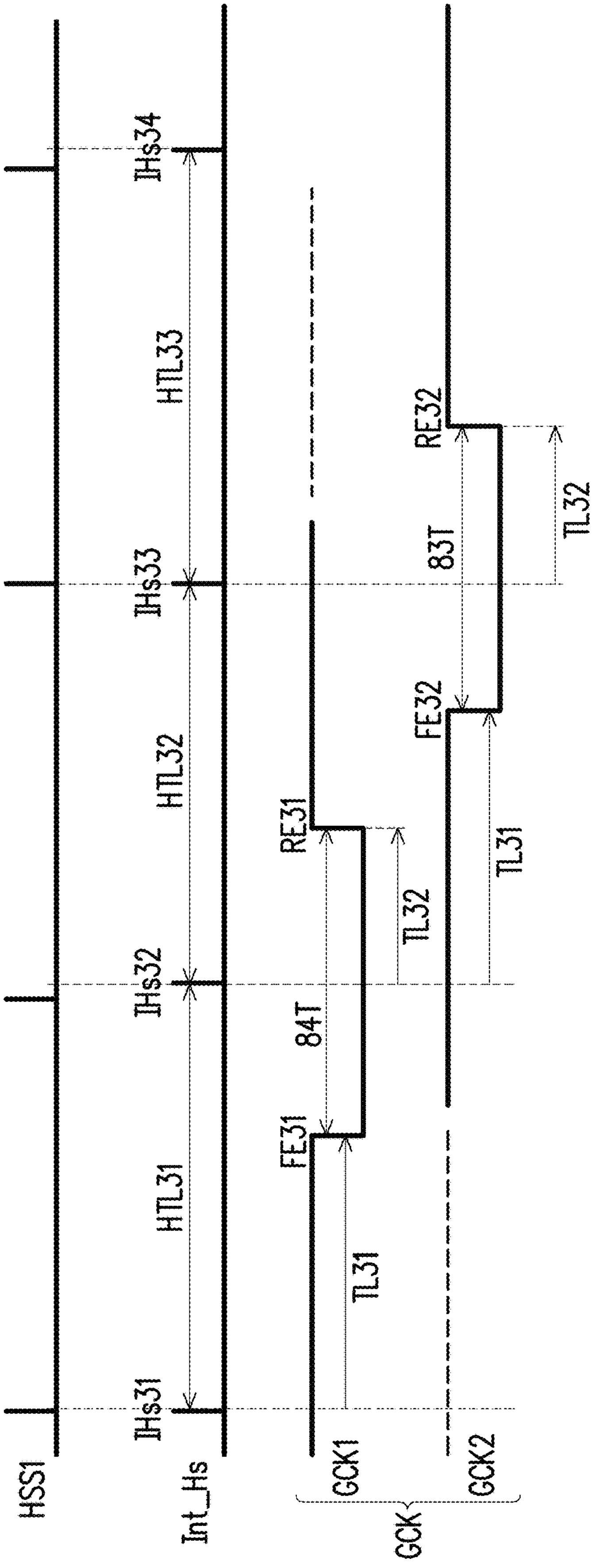
FIG. 3 is a timing/phase diagram of a horizontal synchronization information, an internal horizontal synchronization signal, and a gate clock signal according to an embodiment of the invention.

FIG. 3 is a timing/phase diagram of the horizontal synchronization information HSS1, the internal horizontal synchronization signal Int_Hs, and the gate clock signal GCK according to an embodiment of the invention. A horizontal axis of FIG. 3 represents time. A vertical line of the horizontal synchronization information HSS1 shown in FIG. 3 represents a "horizontal synchronization phase" of the horizontal synchronization information HSS1. The "horizontal synchronization phase" may be a time point of the HSS (vertical sync start) mark defined by the MIPI specification. The horizontal synchronization information HSS1, the internal horizontal synchronization signal Int_Hs and the gate clock signal GCK shown in FIG. 3 may be used as one of many implementation examples of the horizontal synchronization information HSS1, the internal horizontal synchronization signal Int_Hs and the gate clock signal GCK shown in FIG. 1. In the embodiment of FIG. 3, the gate clock signal GCK includes a gate clock signal GCK1 and a gate clock signal GCK2.

Referring to FIG. 1 and FIG. 3, the synchronization signal generating circuit 122 may generate the internal horizontal synchronization signal Int_Hs based on the horizontal synchronization information HSS1. A vertical line of the internal horizontal synchronization signal Int_Hs shown in FIG. 3 represents a "pulse phase" of the internal horizontal synchronization signal Int_Hs. Generally, due to various reasons, the phase of the internal horizontal synchronization signal Int_Hs may constantly change (as shown in FIG. 3). In the embodiment of FIG. 3, horizontal synchronization pulses IHs31 and IHs32 adjacent in timing in the internal horizontal synchronization signal Int_Hs define a horizontal time length HTL31, and horizontal synchronization pulses IHs32 and IHs33 adjacent in timing in the internal horizontal synchronization signal Int_Hs define a horizontal time length HTL32, and the horizontal synchronization pulses IHs33 and IHs34 adjacent in timing in the internal horizontal synchronization signal Int_Hs define a horizontal time length HTL33. For the convenience of explanation, it is assumed that the horizontal time length HTL31 is 94T (94 time units), the horizontal time length HTL32 is 93T (93 time units), and the horizontal time length HTL33 is 94T (94 time units), where each time unit refers to a time of a single pulse of the internal horizontal synchronization signal Int_Hs, or a cycle time of the clock signal corresponding to the internal horizontal synchronization signal Int_Hs.

In the embodiment shown in FIG. 3, a time point of the falling edge and a time point of the rising edge of the gate clock signal GCK use different horizontal synchronization pulses of the internal horizontal synchronization signal Int_Hs as reference time points. For example, a time point of a falling edge FE31 of the gate clock signal GCK1 uses the horizontal synchronization pulse IHs31 of the internal horizontal synchronization signal Int_Hs as the reference time, while a time point of a rising edge RE31 of the gate clock signal GCK1 uses the horizontal synchronization pulse IHs32 of the internal horizontal synchronization signal Int_Hs as the reference time. The synchronization signal generating circuit 122 starts counting a time length TL31 from the horizontal synchronization pulse IHs31. At the end of the time length TL31, the synchronization signal generating circuit 122 pulls down the gate clock signal GCK1 from the high logic level to the low logic level. The "low logic level" of the gate clock signal GCK1 represents the ON time of the gate clock signal GCK1. Then, the synchronization signal generating circuit 122 starts counting a time length TL32 from the horizontal synchronization pulse IHs32. At the end of the time length TL32, the synchronization signal generating circuit 122 pulls the gate clock signal GCK1 back from the low logic level to the high logic level. Deduced by analogy, the synchronization signal generating circuit 122 starts counting the time length TL31 from the horizontal synchronization pulse IHs32 to determine the time point of the falling edge FE32 of the gate clock signal GCK2, and starts counting the time length TL32 from the horizontal synchronization pulse IHs33 to determine the time point of the rising edge RE32 of the gate clock signal GCK2.

In the embodiment shown in FIG. 3, as the phase of the internal horizontal synchronization signal Int_Hs changes, the transition phase (the phase of the rising edge and/or falling edge) of the gate clock signal GCK may constantly change. For convenience of explanation, it is assumed that the horizontal time length HTL31 is 94T (94 time units), the horizontal time length HTL32 is 93T (93 time units), the time length TL31 is 50T (50 time units), and the time length TL32 is 40T (40 time units). A time length from the falling edge FE31 to the rising edge RE31, which is the ON time (or ON time length) of the gate clock signal GCK1, is 94T−50T+40T=84T. A time length from the falling edge FE32 to the rising edge RE32, i.e., the ON time of the gate clock signal GCK2, is 93T−50T+40T=83T. As the phase of the internal horizontal synchronization signal Int_Hs changes, the ON time length of the gate clock signal GCK may constantly change. The ON time length of the gate clock signal GCK is not fixed, which means that a charging time of pixels may be longer or shorter, which may cause abnormal display of the display panel 130. The following embodiments illustrate how to ensure the ON time length of the gate clock signal GCK to be fixed.

Figure 4:
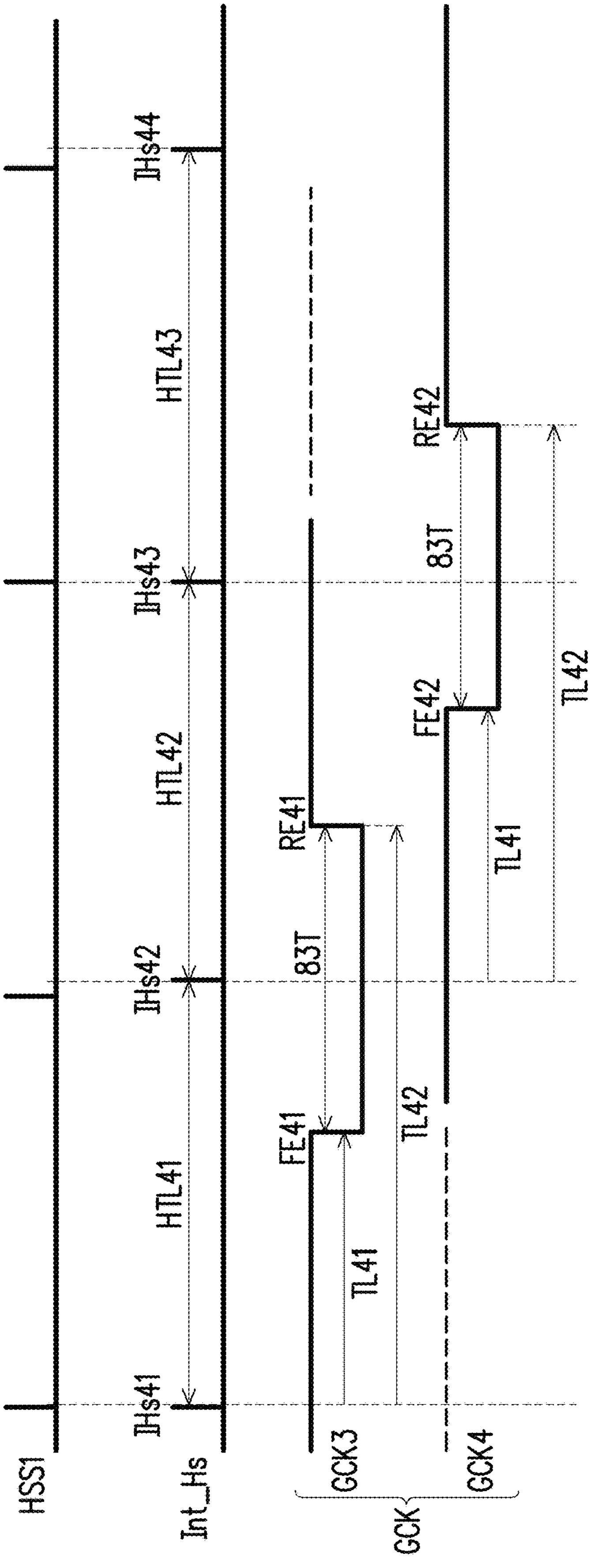
FIG. 4 is a timing/phase diagram of the horizontal synchronization information, the internal horizontal synchronization signal, and the gate clock signal according to an embodiment of the invention.

FIG. 4 is a timing/phase diagram of the horizontal synchronization information HSS1, the internal horizontal synchronization signal Int_Hs, and the gate clock signal GCK according to an embodiment of the invention. A horizontal axis of FIG. 4 represents time. The horizontal synchronization information HSS1, the internal horizontal synchronization signal Int_Hs and the gate clock signal GCK shown in FIG. 4 may be used as one of many implementation examples of the horizontal synchronization information HSS1, the internal horizontal synchronization signal Int_Hs and the gate clock signal GCK shown in FIG. 1. In the embodiment shown in FIG. 4, the gate clock signal GCK includes a gate clock signal GCK3 and a gate clock signal GCK4. The horizontal synchronization information HSS1, the internal horizontal synchronization signal Int_Hs, a horizontal synchronization pulse IHs41, a horizontal synchronization pulse IHs42, a horizontal synchronization pulse IHs43, a horizontal synchronization pulse IHs44, a horizontal time length HTL41, a horizontal time length HTL42 and a horizontal time length HTL43 shown in FIG. 4 may be deduced with reference of related descriptions of the horizontal synchronization information HSS1, the internal horizontal synchronization signal Int_Hs, the horizontal synchronization pulse IHs31, the horizontal synchronization pulse IHs32, the horizontal synchronization pulse IHs33, the horizontal synchronization pulse IHs34, the horizontal time length HTL31, the horizontal time length HTL32, and the horizontal time length HTL33.

In the embodiment shown in FIG. 4, the synchronization signal generating circuit 122 uses a same horizontal synchronization pulse of the internal horizontal synchronization signal Int_Hs as a reference time point, and then uses the same reference time point to determine the transition phase (the phase of the rising edge or the falling edge) of the gate clock signal GCK. Referring to FIG. 1 and FIG. 4, the synchronization signal generating circuit 122 starts counting the time length TL41 (the first counting time length) and the time length TL42 (the second counting time length) from the same horizontal synchronization pulse IHs41 (the first horizontal synchronization pulse). At the end of the time length TL41, the synchronization signal generating circuit 122 pulls the gate clock signal GCK3 from the high logic level to the low logic level. At the end of the time length TL42, the synchronization signal generating circuit 122 pulls the gate clock signal GCK3 back from the low logic level to the high logic level. The time length TL41 is less than the horizontal time length HTL41 (the first horizontal time length), and the time length TL42 is greater than the horizontal time length HTL41. Namely, the horizontal synchronization pulse IHs42 (the second horizontal synchronization pulse) of the internal horizontal synchronization signal Int_Hs occurs during a period when the gate clock signal GCK3 is at the low logic level.

Similarly, the synchronization signal generating circuit 122 starts counting the time length TL41 (the third counting time length) and the time length TL42 (the fourth counting time length) from the same horizontal synchronization pulse IHs42. At the end of the time length TL41, the synchronization signal generating circuit 122 pulls the gate clock signal GCK4 from the high logic level to the low logic level. At the end of the time length TL42, the synchronization signal generating circuit 122 pulls the gate clock signal GCK4 back from the low logic level to the high logic level. The time length TL41 is less than the horizontal time length HTL42 (the second horizontal time length), and the time length TL42 is greater than the horizontal time length HTL42. Namely, the horizontal synchronization pulse IHs43 (the third horizontal synchronization pulse) of the internal horizontal synchronization signal Int_Hs occurs during the period when the gate clock signal GCK4 is at the low logic level.

Since the synchronization signal generating circuit 122 uses the same horizontal synchronization pulse IHs41 of the internal horizontal synchronization signal Int_Hs as the reference time point, the phase of the horizontal synchronization pulse IHs42 does not affect a transition phase (a time point of the rising edge RE41) of the gate clock signal GCK3 pulled back from the low logic level to the high logic level. Since the synchronization signal generating circuit 122 uses the same horizontal synchronization pulse IHs42 of the internal horizontal synchronization signal Int_Hs as the reference time point, the phase of the horizontal synchronization pulse IHs43 does not affect a transition phase (a time point of the rising edge RE42) of the gate clock signal GCK4 pulled back from the low logic level to the high logic level. The synchronization signal generating circuit 122 outputs the gate clock signals GCK3 and GCK4 to the scan circuit (not shown) of the display panel 130, so that the scan circuit drives a plurality of scan lines (not shown) of the display panel 130.

In summary, the DDIC 120 generates the internal horizontal synchronization signal Int_Hs based on the horizontal synchronization information HSS1 provided by the processor 110, and then generates the gate clock signal GCK to the scan circuit (not shown) of the display panel 130 based on the internal horizontal synchronization signal Int_Hs. Specifically, the DDIC 120 counts the first counting time length and the second counting time length (i.e., the phases of the falling edge FE41 and the rising edge RE41 of the gate clock signal GCK3) based on the phase of the same horizontal synchronization pulse IHs41 in the internal horizontal synchronization signal Int_Hs. The DDIC 120 counts the third counting time length and the fourth counting time length (i.e., the phases of the falling edge FE42 and the rising edge of the gate clock signal GCK4) based on the phase of the same horizontal synchronization pulse IHs42 in the internal horizontal synchronization signal Int_Hs. Since the phase of the falling edge FE41 and the phase of the rising edge RE41 have the same time reference point (using the same horizontal synchronization pulse IHs41 in the internal horizontal synchronization signal Int_Hs), and the phase of the falling edge FE42 and the phase of the rising edge RE42 have the same time reference point (using the same horizontal synchronization pulse IHs42 in the internal horizontal synchronization signal Int_Hs), the ON time (or ON time length) of the gate clock signal GCK may be guaranteed to be fixed.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A display driver integrated circuit comprising:

an interface circuit to receive a data stream from a processor, wherein the data stream comprises display frame data, vertical synchronization information, and horizontal synchronization information; and a synchronization signal generating circuit to generate an internal horizontal synchronization signal based on the horizontal synchronization information, the synchronization signal generating circuit starts counting a first counting time length and a second counting time length from a first horizontal synchronization pulse, pulls a first gate clock signal from a first level to a second level at the end of the first counting time length, and pulls the first gate clock signal back from the second level to the first level at the end of the second counting time length, wherein the first counting time length is less than a first horizontal time length, the second counting time length is greater than the first horizontal time length, and the first horizontal time length is a time length between the first horizontal synchronization pulse and a second horizontal synchronization pulse.

2. The display driver integrated circuit as claimed in claim 1 further comprising:

a driving circuit coupled to the interface circuit to receive the display frame data, and coupled to the synchronization signal generating circuit to receive an internal vertical synchronization signal and the internal horizontal synchronization signal, wherein the driving circuit drives a plurality of data lines of the display panel based on the display frame data, the internal vertical synchronization signal and the internal horizontal synchronization signal.

3. The display driver integrated circuit as claimed in claim 1, wherein the interface circuit receives the data stream from the processor through a mobile industry processor interface.

4. The display driver integrated circuit as claimed in claim 1, wherein the second horizontal synchronization pulse of the internal horizontal synchronization signal occurs during a period when the first gate clock signal is at the second level, and a phase of the second horizontal synchronization pulse does not affect a transition phase of the first gate clock signal pulled back from the second level to the first level.

5. The display driver integrated circuit as claimed in claim 1, wherein a second horizontal time length is a time length between the second horizontal synchronization pulse and a third horizontal synchronization pulse in the internal horizontal synchronization signal, the synchronization signal generating circuit starts counting a third counting time length and a fourth counting time length from the second horizontal synchronization pulse, the third counting time length is less than the second horizontal time length, the synchronization signal generating circuit pulls a second gate clock signal from a third level to a fourth level at the end of the third counting time length, the fourth counting time length is greater than the second horizontal time length, the synchronization signal generating circuit pulls the second gate clock signal back from the fourth level to the third level at the end of the fourth counting time length, and the synchronization signal generating circuit outputs the second gate clock signal to the scan circuit of the display panel to drive the scan lines of the display panel.

6. The display driver integrated circuit as claimed in claim 5, wherein the third horizontal synchronization pulse of the internal horizontal synchronization signal occurs during a period when the second gate clock signal is at the fourth level, and a phase of the third horizontal synchronization pulse does not affect a transition phase of the second gate clock signal pulled back from the fourth level to the third level.

7. An operating method of a display driver integrated circuit comprising:

receiving a data stream from a processor by an interface circuit of the display driver integrated circuit, wherein the data stream comprises display frame data, vertical synchronization information, and horizontal synchronization information;

generating an internal horizontal synchronization signal by a synchronization signal generating circuit of the display driver integrated circuit based on the horizontal synchronization information;

counting a first counting time length and a second counting time length from a first horizontal synchronization pulse in the internal horizontal synchronization signal by the synchronization signal generating circuit;

pulling a first gate clock signal from a first level to a second level by the synchronization signal generating circuit at the end of the first counting time length; and pulling the first gate clock signal back from the second level to the first level by the synchronization signal generating circuit at the end of the second counting time length, wherein the first counting time length is less than a first horizontal time length, the second counting time length is greater than the first horizontal time length, and the first horizontal time length is a time length between the first horizontal synchronization pulse and a second horizontal synchronization pulse in the internal horizontal synchronization signal.

8. The operating method of the display driver integrated circuit as claimed in claim 7 further comprising:

driving a plurality of data lines of the display panel by a driving circuit of the display driver integrated circuit based on the display frame data, an internal vertical synchronization signal, and the internal horizontal synchronization signal.

9. The operating method of the display driver integrated circuit as claimed in claim 7, wherein the interface circuit receives the data stream from the processor through a mobile industry processor interface.

10. The operating method of the display driver integrated circuit as claimed in claim 7, wherein the second horizontal synchronization pulse of the internal horizontal synchronization signal occurs during a period when the first gate clock signal is at the second level, and a phase of the second horizontal synchronization pulse does not affect a transition phase of the first gate clock signal pulled back from the second level to the first level.

11. The operating method of the display driver integrated circuit as claimed in claim 7, wherein a second horizontal time length is a time length between the second horizontal synchronization pulse and a third horizontal synchronization pulse in the internal horizontal synchronization signal, the synchronization signal generating circuit outputs a second gate clock signal to the scan circuit of the display panel to drive the scan lines of the display panel, and the operating method further comprises:

starting counting a third counting time length and a fourth counting time length from the second horizontal synchronization pulse, wherein the third counting time length is less than the second horizontal time length, and the fourth counting time length is greater than the second horizontal time length;

pulling the second gate clock signal from a third level to a fourth level at the end of the third counting time length; and pulling the second gate clock signal back from the fourth level to the third level at the end of the fourth counting time length.

12. The operating method of the display driver integrated circuit as claimed in claim 11, wherein the third horizontal synchronization pulse of the internal horizontal synchronization signal occurs during a period when the second gate clock signal is at the fourth level, and a phase of the third horizontal synchronization pulse does not affect a transition phase of the second gate clock signal pulled back from the fourth level to the third level.

13. A display device comprising:

a processor;

a display panel; and a display driver integrated circuit coupled to the processor to receive a data stream, wherein the data stream comprises display frame data, vertical synchronization information, and horizontal synchronization information, the display driver integrated circuit generates an internal horizontal synchronization signal based on the horizontal synchronization information, the display driver integrated circuit starts counting a first counting time length and a second counting time length from a first horizontal synchronization pulse in the internal horizontal synchronization signal, the display driver integrated circuit pulls a first gate clock signal from a first level to a second level at the end of the first counting time length, and the display driver integrated circuit pulls the first gate clock signal back from the second level to the first level at the end of the second counting time length, wherein the first counting time length is less than a first horizontal time length, the second counting time length is greater than the first horizontal time length, and the first horizontal time length is a time length between the first horizontal synchronization pulse and a second horizontal synchronization pulse in the internal horizontal synchronization signal.

14. The display device as claimed in claim 13, wherein the display driver integrated circuit comprises:

an interface circuit to receive the data stream from the processor; and a synchronization signal generating circuit coupled to the interface circuit to receive the vertical synchronization information and the horizontal synchronization information, wherein the synchronization signal generating circuit generates the internal horizontal synchronization signal based on the horizontal synchronization information, the synchronization signal generating circuit starts counting the first counting time length and the second counting time length from the first horizontal synchronization pulse, the synchronization signal generating circuit pulls the first gate clock signal from the first level to the second level at the end of the first counting time length, the synchronization signal generating circuit pulls the first gate clock signal back from the second level to the first level at the end of the second counting time length, and the synchronization signal generating circuit outputs the first gate clock signal to a scan circuit to drive the scan lines of the display panel.

15. The display device as claimed in claim 14, wherein the display driver integrated circuit further comprises:

a driving circuit coupled to the interface circuit to receive the display frame data, and coupled to the synchronization signal generating circuit to receive an internal vertical synchronization signal and the internal horizontal synchronization signal, wherein the driving circuit drives a plurality of data lines of the display panel based on the display frame data, the internal vertical synchronization signal, and the internal horizontal synchronization signal.

16. The display device as claimed in claim 14, wherein the interface circuit receives the data stream from the processor through a mobile industry processor interface.

17. The display device as claimed in claim 14, wherein the second horizontal synchronization pulse of the internal horizontal synchronization signal occurs during a period when the first gate clock signal is at the second level, and a phase of the second horizontal synchronization pulse does not affect a transition phase of the first gate clock signal pulled back from the second level to the first level.

18. The display device as claimed in claim 14, wherein a second horizontal time length is a time length between the second horizontal synchronization pulse and a third horizontal synchronization pulse in the internal horizontal synchronization signal, the synchronization signal generating circuit starts counting a third counting time length and a fourth counting time length from the second horizontal synchronization pulse, the third counting time length is less than the second horizontal time length, the synchronization signal generating circuit pulls a second gate clock signal from a third level to a fourth level at the end of the third counting time length, the fourth counting time length is greater than the second horizontal time length, the synchronization signal generating circuit pulls the second gate clock signal back from the fourth level to the third level at the end of the fourth counting time length, and the synchronization signal generating circuit outputs the second gate clock signal to the scan circuit of the display panel to drive the scan lines of the display panel.

19. The display device as claimed in claim 18, wherein the third horizontal synchronization pulse of the internal horizontal synchronization signal occurs during a period when the second gate clock signal is at the fourth level, and a phase of the third horizontal synchronization pulse does not affect a transition phase of the second gate clock signal pulled back from the fourth level to the third level.

* * * * *